United States Patent [19]
Kim

[11] Patent Number: 5,854,876
[45] Date of Patent: Dec. 29, 1998

[54] CIRCUIT AND METHOD FOR SYNC DETECTION AND PROTECTION

[75] Inventor: Yong-je Kim, Kunpo, Rep. of Korea

[73] Assignee: Samsung Electronics Co., Ltd., Kyungki-Do, Rep. of Korea

[21] Appl. No.: 655,936

[22] Filed: May 31, 1996

[30] Foreign Application Priority Data

Sep. 6, 1995 [KR] Rep. of Korea ................. 1995 29164

[51] Int. Cl.[6] .......................... H04N 5/926; H04N 5/932
[52] U.S. Cl. .............................................. 386/124; 386/84
[58] Field of Search .................................. 386/2, 47, 48, 386/84, 12, 71, 124, 66, 61; H04N 5/926, 5/932

[56] References Cited

U.S. PATENT DOCUMENTS

| | | | |
|---|---|---|---|
| 4,747,116 | 5/1988 | Yajima et al. | 375/114 |
| 5,228,041 | 7/1993 | Yoshino et al. | 371/47.1 |
| 5,406,569 | 4/1995 | Isozaki | 371/42 |

*Primary Examiner*—Robert Chevalier
*Attorney, Agent, or Firm*—Sughrue, Mion, Zinn, Macpeak & Seas, PLLC

[57] ABSTRACT

A sync detecting and protecting circuit for use in a reproducing apparatus is provided. The sync detecting and protecting circuit has a first detector for detecting a pre-amble pattern of the digital data received from the recording medium and for outputting a corresponding area signal, a second detector for detecting a sync of the received digital data, for comparing the detected sync and a predetermined sync pattern, and for outputting a sync detection signal, an ID separator for separating the ID code following the detected sync, for comparing the separated ID with those of the previous track and sync block, and for outputting an ID comparison signal, and a control signal generator for generating a sync control signal on the basis of the sync detection signal and the ID comparison signal, and for generating a pseudo-sync control signal if the detected sync has an error. Therefore, the sync used for detecting data at a predetermined position is accurately detected and a pseudo-sync control signal is generated even if an error is found in the sync, thereby enabling the correct detection of the data in the predetermined position.

18 Claims, 6 Drawing Sheets

CIRCUIT AND METHOD FOR SYNC DETECTION AND PROTECTION

BACKGROUND OF THE INVENTION

Field of the Invention

The present invention relates to a circuit and method of sync detection and protection. More particularly, the invention relates to a circuit and a method for accurately detecting the data at a predetermined position in a digital VCR by accurately detecting a sync signal and generating a pseudo-sync control signal when an error is found in the sync.

A standard definition (SD) video cassette recorder (VCR) in which standard-definition NTSC and PAL signals are recorded and reproduced using digital video tape has been developed. Accordingly, an SD signal recording format has been established. Advanced-television (ATV) and digital video broadcast (DVB) VCRs are currently under development for recording and reproducing ATV and DVB signals using digital video tape. In both the ATV-VCR and the DVB-VCR, the signals are recorded on digital video tape in the SD recording format.

The track and data sector structures of the SD-format digital video tape used in a digital video cassette recorder will be described.

Figure 1:
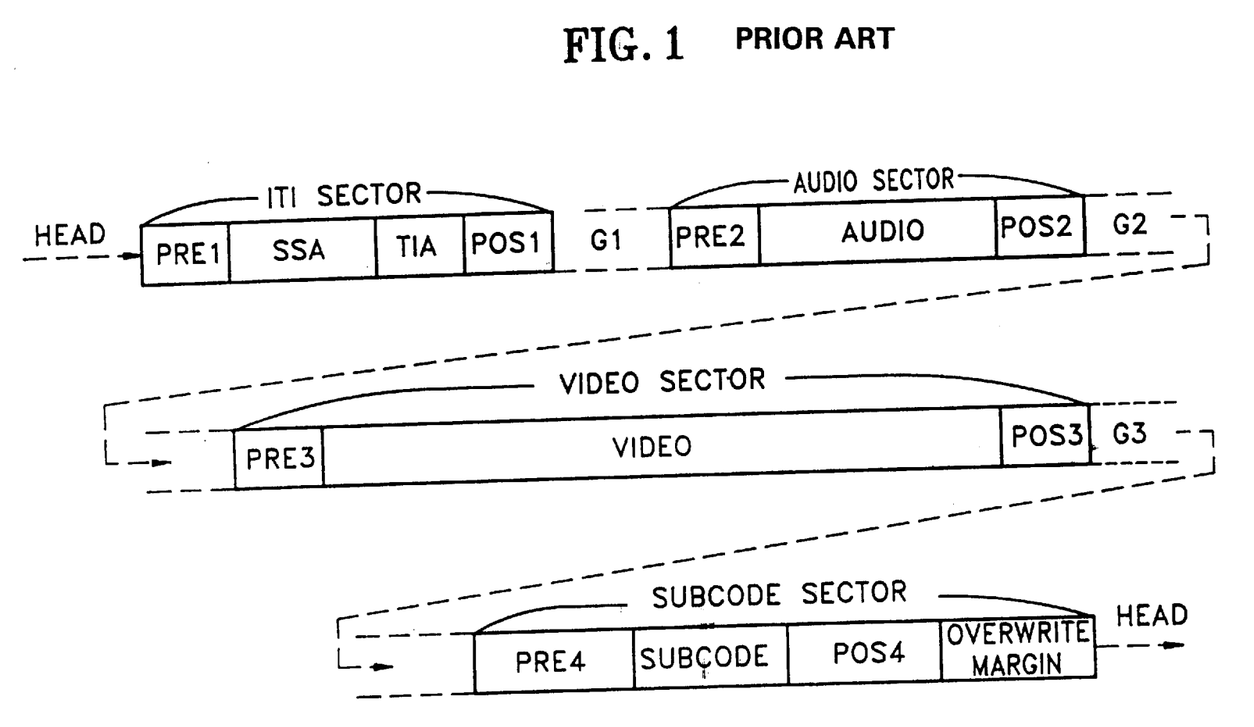
FIG. 1 illustrates an arrangement of sectors on a helical track of a tape in a digital VCR.

FIG. 1 illustrates an arrangement of sectors on a helical track of the digital video tape having the SD recording format.

On the track, an insert and track information (ITI) sector, an audio sector, a video sector and a subcode sector are arranged in order from the position of the track where a head begins to scan. Data location on the track is as follows.

The ITI sector consists of a 1,400-bit ITI pre-amble area (PRE1), a 1,830-bit start sync block area (SSA), a 90-bit track information area (TIA), and a 280-bit ITI post-amble area (POS1).

The audio sector consists of an audio pre-amble area (PRE2) comprising 400-bit run-up data and 2 pre-sync blocks, an audio data area (AUDIO) including 14 data sync blocks, and a 550-bit audio post-amble area (POS2) having a post-sync block and a 500-bit guard area.

The video sector consists of a video pre-amble area (PRE3) comprising 400-bit run-up data and 2 pre-sync blocks, a video data area (VIDEO) including 149 data sync blocks, and a 975-bit video post-amble area (POS3) having a post-sync block and a 925-bit guard area.

The subcode sector consists of a 1,200-bit subcode pre-amble area (PRE4), a 1,200-bit subcode area (SUBCODE), and a subcode post-amble area (POS4) having 1,200 bits for a 625 line/50 field system but 1,325 bits for a 525 line/60 field system. A 1,250-bit overwrite margin area follows the POS4 area of the subcode sector.

A data sync block for the audio and video sectors has 750 bits. Each of edit gaps G1, G2, and G3 exists between sectors. G1, G2 and G3 have 625 bits, 700 bits, and 1,550 bits, respectively.

The structure of the video sector in the track shown in FIG. 1 will be described in more detail.

Figure 2:
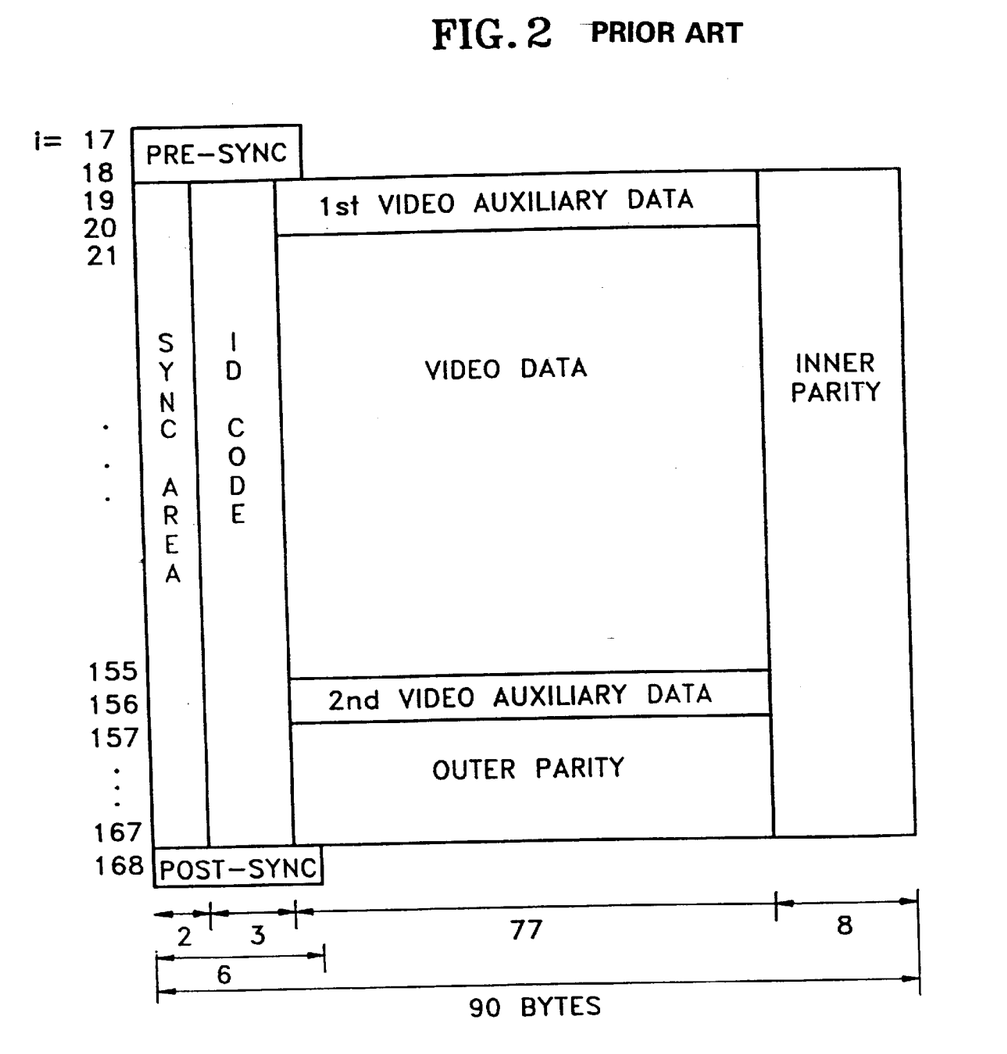
FIG. 2 illustrates the structure of the video sector shown in FIG. 1.

FIG. 2 illustrates the pre-sync block, video data area, and post-sync block of the video sector.

Referring to FIG. 2, the video data area comprises sync blocks 19 and 20 for first video auxiliary data, sync blocks 21–155 for video data, a sync block 156 for second video auxiliary data, and sync blocks 157–167 for an outer parity. Each sync block has a 2-byte sync, a 3-byte identification (ID) code, 77-byte data, and an 8-byte inner parity.

Sync blocks 17 and 18 are pre-sync blocks of PRE3 and a sync block 168 is a post-sync block of POS3.

Figure 3:
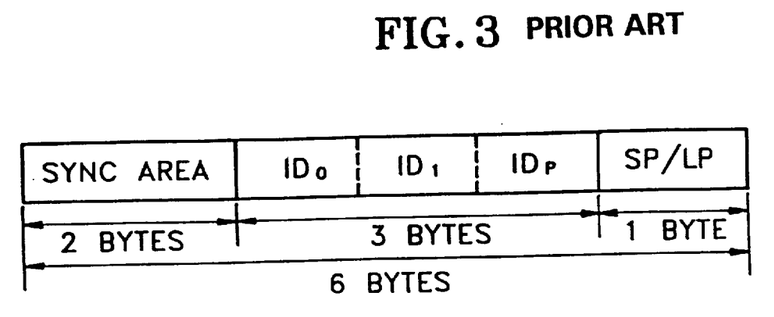
FIG. 3 illustrates the structure of a pre-sync block shown in FIG. 2.

FIG. 3 illustrates the structure of a pre-sync block shown in FIG. 2.

Referring to FIG. 3, each of the two pre-sync blocks shown in FIG. 2 has a 2-byte sync, a 3-byte ID code, and a 1-byte SP/LP code. SP/LP=$FF_h$ is assigned to the SP mode and SP/LP=$00_h$ is assigned to the LP mode. $ID_0$ of the ID code ($ID_0$, $ID_1$ and $ID_p$) indicates track pair information and application information, $ID_1$ indicates a sync block number, and $ID_p$ is a 1-byte error correction ID parity for $ID_0$ and $ID_1$.

Figure 4:
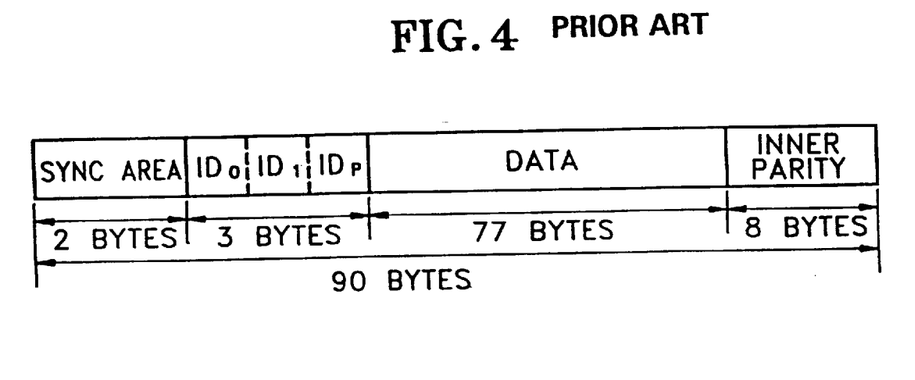
FIG. 4 illustrates the structure of a data-sync block of the video sector shown in FIG. 2.

FIG. 4 illustrates the structure of a data sync block of the video data area shown in FIG. 2.

Referring to FIG. 4, the data sync block comprises a 2-byte sync, a 3-byte ID code, 77-byte data, and an 8-byte inner code-error correction inner parity. $ID_0$ of the 3-byte ID code ($ID_0$, $ID_1$ and $ID_p$) indicates a sequence number and track pair information for sync blocks 19–156 and track pair information and application information is for sync blocks 157–168, $ID_1$ indicates a sync block number, and $ID_p$ is an error correction ID parity for $ID_0$ and $ID_1$.

Figure 5:
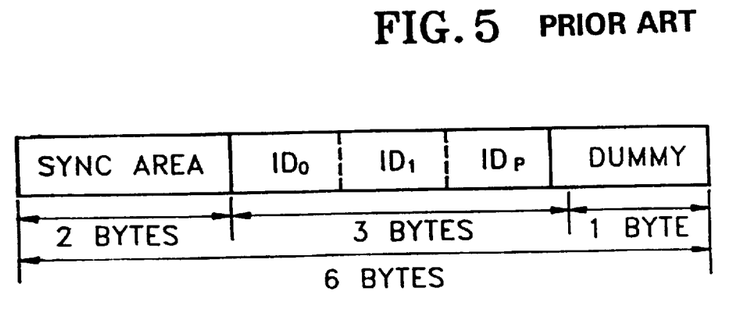
FIG. 5 illustrates the structure of a post-sync block shown in FIG. 2.

FIG. 5 illustrates the structure of a post-sync block shown in FIG. 2.

Referring to FIG. 5, the post-sync block comprises a 2-byte sync, a 3-byte ID code, and 1-byte dummy data. The dummy data is always $FF_h$. $ID_0$ of the ID code ($ID_0$, $ID_1$ and $ID_p$) indicates track pair information and application information, $ID_1$ indicates a sync block number, and $ID_p$ indicates an error correction ID parity for $ID_0$ and $ID_1$.

The pre-sync block and post-sync block shown in FIGS. 3 and 5 have a common form for the audio and video sectors.

In a digital VCR having the above-described recording format, a sync must be accurately detected during playback in order to accurately detect the data of each area which has been recorded in a predetermined position.

Either sync pattern SYNC-D or SYNC-E, shown below, is recorded in the sync areas of the pre-sync blocks of PRE2, the data sync blocks of AUDIO, and the post-sync block of POS2 in the audio sector, and in the sync areas of the pre-sync block of PRE3, the data sync blocks of VIDEO, and the post-sync block of POS3 in the video sector, shown in FIG. 1.

SYNC-D: 0 0 0 1 1 1 1 1 1 1 1 1 0 0 0 1
SYNC-E: 1 1 1 0 0 0 0 0 0 0 0 0 1 1 1 0

Either sync pattern SYNC-F or SYNC-G, shown below, is recorded in the sync areas of the subcode sync block of the subcode sector shown in FIG. 1.

SYNC-F: 0 0 0 0 0 1 1 1 1 1 1 1 1 1 0 1

SYNC-G: 1 1 1 1 1 0 0 0 0 0 0 0 0 0 1 0

Either run-up pattern RUN-A or RUN-B, shown below, is recorded in edit gap G1 between the ITI sector and the audio sector, edit gap G2 between the audio sector and the video sector, edit gap G3 between the video sector and the subcode sector, the run-up area of the pre-amble in each sector and the guard area of the post-amble in each sector.

RUN-A: 0 0 0 1 1 1 0 0 0 1 1 1 0 0 0 0 0 1 1 1 0 0 0 1 1
RUN-B: 1 1 1 0 0 0 1 1 1 0 0 0 1 1 1 1 1 0 0 0 1 1 1 0 0

In the reproducing apparatus of a conventional digital VCR, a sync protection circuit is provided since an accurate data detection is difficult when the sync contains an error.

In a sync detection circuit (U.S. Pat. No. 4,747,116), a sync indication signal is detected by comparing a predetermined sync pattern with a sync pattern of an input digital signal. The errors in the input digital sync are detected, the detected sync indication signal is output if the number of the errors is a predetermined value or below, and output of the detected sync indication signal is prevented if the number exceeds the predetermined value.

In a sync detection circuit for a rotating-head digital audio tape recorder (U.S. Pat. No. 5,228,041), a sync of serial digital data having an error detection code generated by a predetermined computation is compared with a predetermined sync pattern during each block period by using an auxiliary code and an address code indicating the address value of the block period. A sync detection signal is generated if the sync is identical with the sync pattern, and an error detection signal is detected through a predetermined computation by using the auxiliary code, the address code, and the error detection code. The sync detection signal is output only if no error is found in the error detection signal.

However, the above-described sync detection circuits cannot be applied to a digital VCR having the SD signal recording format and do not have the function of generating a pseudo-sync control signal, as in the present invention. The pseudo-sync control signal is generated when there is an error in a sync pattern.

SUMMARY OF THE INVENTION

It is an object of the present invention to provide a sync detecting and protecting circuit for accurately detecting the data recorded in a predetermined area of each track by detecting a sync and generating a pseudo-sync control signal when an error is found in the sync.

It is another object of the present invention to provide a sync detecting and protecting method for accurately detecting the data recorded in a predetermined area of each track by detecting a sync and generating a pseudo-sync control signal when an error is found in the sync.

To achieve the above object, there is provided a sync detecting and protecting circuit for use in a reproducing apparatus for reproducing digital data from a recording medium wherein a predetermined plurality of areas for recording the digital data are arranged in each track, each area comprises a plurality of sync blocks, and a predetermined pre-amble pattern is recorded at the start of each area, the sync detecting and protecting circuit comprising: first detecting means for detecting a pre-amble pattern of the digital data received from the recording medium, and outputting a corresponding area signal; second detecting means for detecting a sync of the received digital data, comparing the detected sync and a predetermined sync pattern, and outputting a sync detection signal; and generating means for generating a sync control signal on the basis of the sync detection signal, and for generating a pseudo-sync control signal if the detected sync has an error.

To achieve another object, there is provided a sync detecting and protecting method for use in a reproducing apparatus for reproducing digital data from a recording medium in which a predetermined plurality of areas for recording the digital data are arranged in each track, each area comprises a plurality of sync blocks, a predetermined pre-amble pattern is recorded at the start of each area, the sync detecting and protecting method comprising the steps of: (a) detecting a pre-amble pattern of the digital data received from the recording medium and generating a corresponding area signal; (b) detecting a sync of the received digital data, comparing the detected sync with a predetermined sync pattern, and generating a sync detection signal; and (c) generating a sync control signal on the basis of the sync detection signal, and generating a pseudo-sync control signal if an error is found in the detected sync.

BRIEF DESCRIPTION OF THE DRAWINGS

The above objects and advantages of the present invention will become more apparent by the following detailed description of a preferred embodiment with reference to the attached drawings in which.

DETAILED DESCRIPTION OF THE INVENTION

Figure 6:
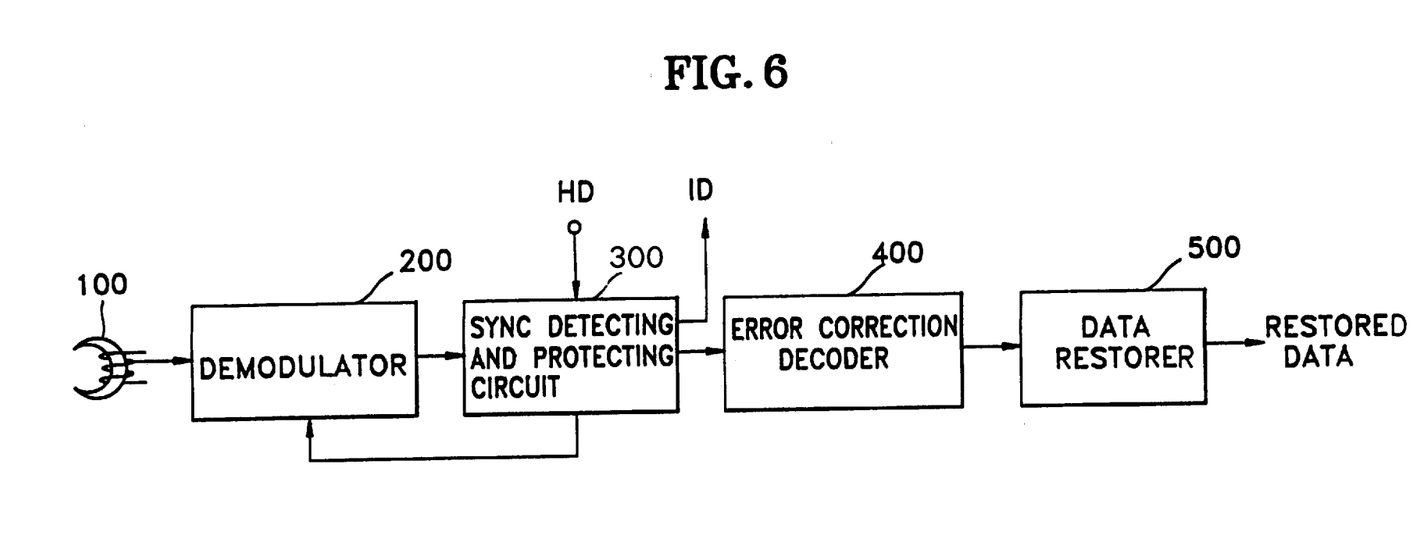
FIG. 6 is a block diagram of the reproducing apparatus of a digital VCR to which the present invention is applied.

FIG. 6 is a block diagram of the reproducing apparatus of a digital VCR to which the present invention is applied.

Referring to FIG. 6, a signal reproduced by a head 100 is input to a demodulator 200. In demodulator 200, reproduced 25-bit data is demodulated to 24-bit data. Here, 24—to—25 modulation is performed during recording. The 24—to—25 modulation indicates that "0" bit or "1" bit is prefixed to 24-bit data, thereby obtaining a 25-bit channel word of an intended frequency spectrum.

As shown in the track structure of FIG. 1, head 100 reads data recorded in a track from PRE1 to POS4. To accurately read the data in each area, a sync must be accurately detected.

Therefore, a sync detecting and protecting circuit 300 detects a sync from the data demodulated in demodulator 200, compares the pattern of the detected sync with a predetermined sync pattern, outputs a sync control signal to demodulator 200 if they are identical, generates a pseudo-sync control signal if an error is found in the detected sync pattern, and outputs the pseudo-sync control signal to demodulator 200.

An error correction decoder 400 error-correction decodes the data coded in the form of a product code, i.e., a Read-Solomon (R-S) code, which is output from sync detecting and protecting circuit 300, by using an inner parity and an outer parity.

A data restorer 500 variable-length-decodes the error-correction decoded data, inverse-quantizes the variable-length-decoded data, and restores the inverse-quantized data to the original data, through an inverse discrete cosine transform operation, by utilizing the quantization step size used during encoding.

Figure 7:
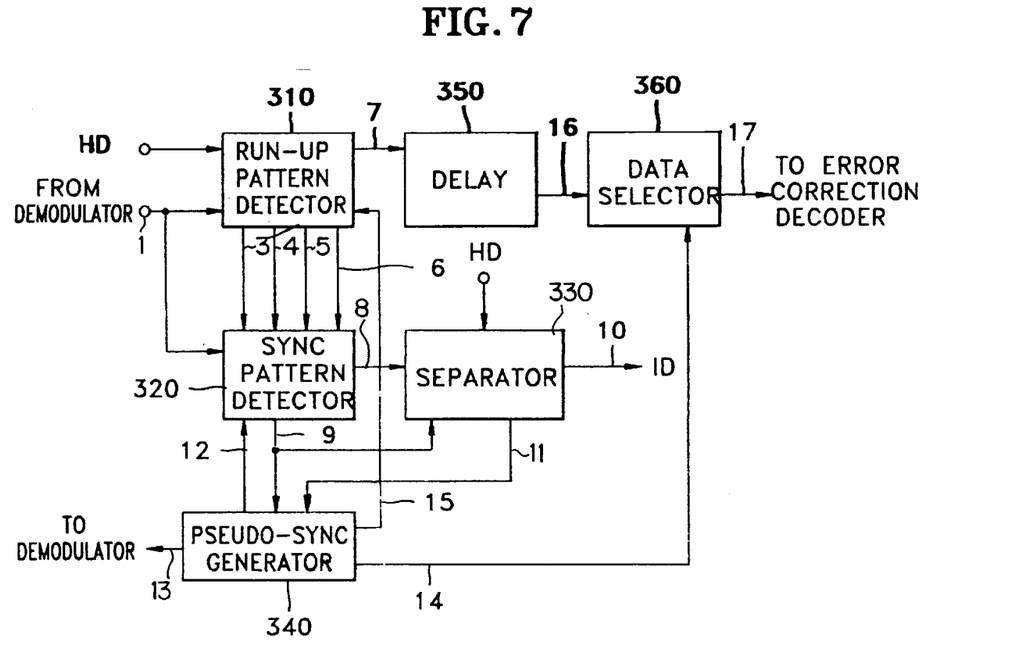
FIG. 7 is a block diagram of a sync detecting and protecting circuit according to the present invention.

FIG. 7 is a block diagram of a sync detecting and protecting circuit according to an embodiment of the present invention.

Referring to FIG. 7, the demodulated data 1 output from demodulator 200 shown in FIG. 6 is input to a run-up pattern detector 310 and a sync pattern detector 320.

Run-up pattern detector 310 detects the run-up pattern of each pre-amble area of the received data and outputs respective area signals corresponding to an ITI area, an audio area, a video area and a subcode area, indicated by reference numerals 3, 4, 5 and 6, respectively.

Sync pattern detector 320 compares a predetermined sync pattern with a sync pattern of the demodulated data 1 received from the demodulator 200, according to area signals 3, 4, 5 and 6, generates a sync detection signal 9, outputs the sync detection signal to an ID separator 330 and a pseudo-sync control signal generator 340, and inputs the demodulated data to ID separator 330.

ID separator 330 separates an ID from the data 8 output from the sync pattern detector 320, according to a head switching signal HD and the sync detection signal 9 output the sync pattern detector 320, outputs error-corrected ID, compares the pre-stored ID with the current ID, and outputs an ID comparison signal 11 to pseudo-sync control signal generator 340.

Pseudo-sync control signal generator 340 outputs a sync stand-by signal 12 to sync pattern detector 320 if the sync detection signal 9 is received from sync pattern detector 320. Pseudo-sync control signal generator 340 outputs a sync control signal 13 to demodulator 200 if a sync detection signal generated during a sync stand-by period and the ID comparison signal 11 are received. With this arrangement, if the ID comparison signal is detected without the sync detection signal, the sync control signal 13 is output to demodulator 200. In this case, the sync control signal 13 acts as a pseudo-sync control signal. Further, the sync control signal is output to demodulator 200 whenever a sync detection signal for a data sync block is detected after the detection of a sync detection signal for a pre-sync block.

Meanwhile, pseudo-sync control signal generator 340 generates a sync and ID area signal 14 whenever the sync control signal is output to demodulator 200, outputs the sync and ID area signal 14 to a data selector 360, and outputs a post-sync detection signal 15 to run-up pattern detector 310 if the sync detection signal detected during the sync stand-by period is for the post-sync of each sector, thereby controlling run-up pattern detector 310 to generate the subsequent area signal.

A delay 350 delays the data demodulated in demodulator 200 and supplies the data 7 from run-up pattern detector 310 during the signal processing period until the sync and ID area signal 14 is generated, and then outputs the delayed data 16 to data selector 360.

Data selector 360 removes sync and the ID from the delayed data 16 according to the sync and ID area signal 14 output from pseudo-sync control signal generator 340 to an error correction decoder 400.

The operation of the circuit shown in FIG. 7 will be described in detail with reference to FIGS. 8–10.

Figure 8:
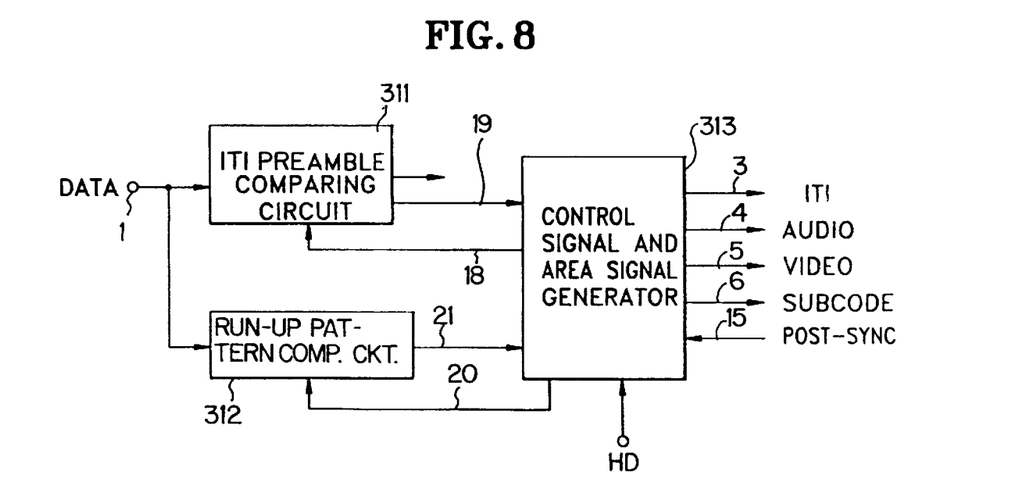
FIG. 8 is a block diagram of the run-up pattern detector shown in FIG. 7.

FIG. 8 is a detailed block diagram of run-up pattern detector 310 shown in FIG. 7.

Referring to FIG. 8, the demodulated data 1 output from the demodulator is input to an ITI pre-amble comparing circuit 311 and a run-up pattern comparing circuit 312.

When a control signal and area signal generator 313 receives head switching signal HD indicative of the start of the play-back of each track, a first enable signal 18 is output to ITI pre-amble circuit 311, thereby turning ITI pre-amble comparing circuit 311 on.

ITI pre-amble comparing circuit 311, containing built-in pre-amble patterns, compares a built-in preamble pattern with a pre-amble pattern of the data 1 and outputs a first comparing signal 19 as a "high" signal to control signal and area signal generator 313. Control signal and area signal generator 313 outputs an ITI area signal ITI 3.

When ITI pre-amble comparing circuit 311 detects an ITI post-amble, the first comparing signal 19 is output as a "low" signal to control signal and area signal generator 313. Then, control signal and area signal generator 313 outputs a second enable signal 20 to a run-up pattern comparing circuit 312, thereby turning run-up pattern comparing circuit 312 on.

Run-up pattern comparing circuit 312, containing built-in run-up patterns RUN-A and RUN-B, compares a built-in run-up pattern with a run-up pattern of the demodulated data 1, outputs a second comparing signal 21 as a "high" signal to control signal and area signal generator 313 if they are identical, and outputs the second comparing signal 21 as a "low" signal to control signal and area signal generator 313 if a post-sync detection signal 15 of an audio sector is input from pseudo-sync control signal generator 340, shown in FIG. 7, a predetermined time later.

With the repetition of the above procedure for the audio, video, and subcode sectors, the second comparing signal 21 alternates between "high" and "low" three times in a track.

That is, in control signal and area signal generator 313, if the second comparing signal 21 at a first logic high level is received from run-up pattern comparing circuit 312, an area signal AUDIO 4 indicative of an audio area is output, if the second comparing signal at a second logic high level is received, an area signal VIDEO 5 indicative of a video area is output, and if the second comparing signal at a third logic high level is received, an area signal SUBCODE 6 indicative of a subcode area is output. The signals 3, 4, 5 and 6 are input to a sync pattern generator 322 of sync pattern detector 320, as shown in FIG. 9. The output data 7 of the ITI pre-amble comparing circuit 311 is output to the delay 350 of FIG. 7.

Figure 9:
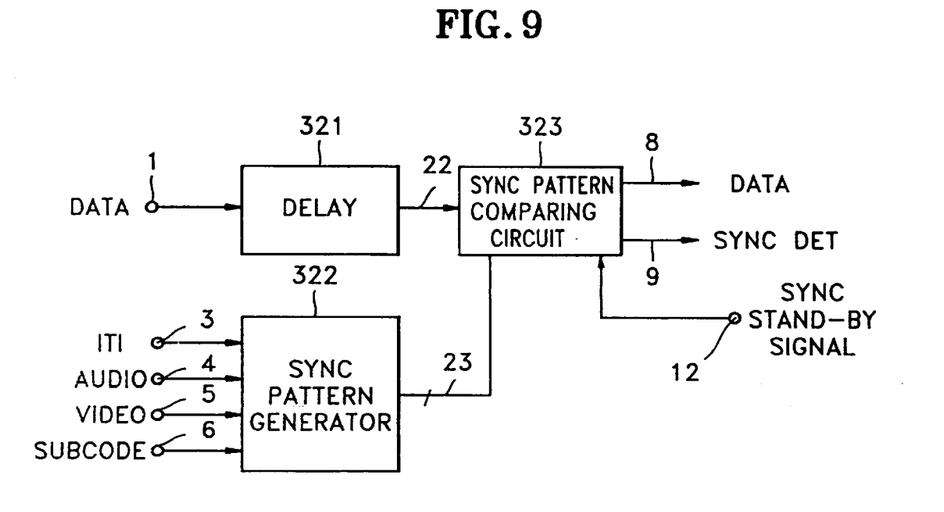
FIG. 9 is a block diagram of the sync pattern detector shown in FIG. 8.

FIG. 9 is a detailed block diagram of sync pattern detector 320 shown in FIG. 7.

Referring to FIG. 9, sync pattern generator 322 contains the sync pattern of each area, and outputs a corresponding sync pattern 23, according to area signals 3, 4, 5 and 6 output from the control signal and area signal generator 313, to a sync pattern comparing circuit 323.

Sync pattern generator 322 generates sync patterns SYNC-D and SYNC-E, described above, if area signals 3, 4, 5 and 6 indicate the audio and video areas, and generates, sync patterns SYNC-F and SYNC-G, if the area signals 3, 4, 5 and 6 indicate the subcode area.

A delay 321 delays the demodulated data 1 by a predetermined time in order to compensate for the time for generating an area signal in run-up pattern detector 310, and outputs the delayed data 22 to sync pattern comparing circuit 323.

In sync pattern comparing circuit 323, the input data 1 is delayed for output as the signal 8. In addition, the sync pattern of the input data is compared with the sync pattern generated in sync pattern generator 322 during the enable period of the sync stand-by signal 12 from the pseudo-sync control signal generator 340. If the input sync pattern and the generated sync are identical, a sync detection signal 9 is output to pseudo-sync control signal generator 340 shown in FIG. 7 and to an ID detector 331 and a buffer 334 of ID separator 330, as shown in FIG. 10.

The data 8 output from sync pattern comparing circuit 323 is delayed by the time for generating a sync detection signal 9, in a delay means (not shown) of sync pattern comparing circuit 323. The data 8 is then output to ID detector 331 shown in FIG. 10.

Figure 10:
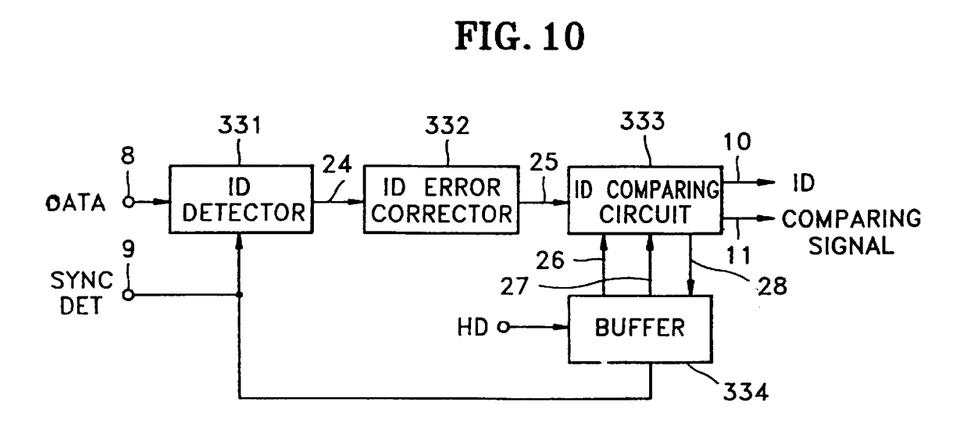
FIG. 10 is a block diagram of the ID separator shown in FIG. 7.

FIG. 10 is a detailed block diagram of ID separator 330 shown in FIG. 7.

Referring to FIG. 10, ID detector 331 detects a 320 byte ID from the data 8 output from the sync pattern comparing circuit 323 shown in FIG. 9.

An ID error corrector 332 corrects the errors of 2-byte ID ($ID_0$ and $ID_1$) of the 3-byte ID with the other 1-byte ID parity ($ID_p$), and outputs the error-corrected 2-byte ID ($ID_0$ and $ID_1$) 25 to an ID comparing circuit 333.

ID comparing circuit 333 outputs the error-corrected 2-byte ID ($ID_0$ and $ID_1$) 10 to be used for system control.

In addition, ID comparing circuit 333 determines the congruity and continuity between the current $ID_0$ and $ID_1$ output from ID error corrector 332 and $ID_0$ and $ID_1$ output from buffer 334 where the $ID_0$ and $ID_1$ of the previous track or the previous sync block are stored.

That is, if head switching signal HD is received, buffer 334 outputs the track pair information bits of the previous track $ID_0$ 26 to ID comparing circuit 333, and whenever a sync detection signal 9 is received from sync pattern comparing circuit 323 shown in FIG. 9, buffer 334 outputs the $ID_1$ of the previous sync block 27 to ID comparing circuit 333.

Here, the $ID_0$ has identical track pair information recorded therein every 2 tracks. The $ID_1$ indicates a sync block number, and thus it must be incremented by "1" whenever a sync detection signal is detected.

ID comparing circuit 333 compares the track pair information of the IDO stored in buffer 334 with the track pair information of the current $ID_0$ by receiving the ID corrected in ID error corrector 332 and the $ID_0$ output from buffer 334. That is, it is determined whether the current $ID_0$ is identical to the $ID_0$ of the previous track and whether its increment amount is "1". Then, the current $ID_1$ is compared with the $ID_1$ of the previous sync block to determine whether the increment amount is "1", that is, to determine whether there is continuity between both the $ID_1$s. When there is congruity and continuity between the current and previous $ID_1$, an ID comparing signal 11 is output as a "high" signal to pseudo-sync control signal generator 340, and the current ID 28 is stored in buffer 334.

In the case where the track pair information of the current $ID_0$ and the previous $ID_0$ is different or there is no continuity between the current $ID_0$ and the previous $ID_0$, the ID comparing signal 11 is output as a "high" signal from ID comparing circuit 333 and the ID of the current sync block is considered to be identical to the ID of the previous sync block. However, in the case where the track pair information of the current $ID_0$ and the previous $ID_0$ also is different in the next sync block, or there is no continuity between the current $ID_1$ and the previous $ID_1$, the ID comparing signal 11 is output as a "low" signal and the ID of the current sync block is considered to disagree with the ID of the previous sync block.

Meanwhile, it must be checked whether a 2-byte sync for a pre-sync and a post-sync is generated at a 6-byte cycle, and a 2-byte sync for a data sync is generated at a 90-byte cycle. The reason is that a sync must be detected at a correct position to prevent the generation of a sync detection signal due to the erroneous generation of the sync pattern in a data area.

Therefore, when a first sync detection signal 9 for each area is received from the sync pattern comparing circuit 323 shown in FIG. 9, pseudo-sync control signal generator 340, shown in FIG. 7, generates a sync stand-by signal for an area of the next coming sync, and outputs the sync stand-by signal 12 to sync pattern comparing circuit 323 of sync pattern detector 320 shown in FIG. 9.

Here, the sync stand-by signal 12 takes different forms depending on the audio, video and subcode areas. For example, in the case of the video area, if a sync detection signal 9 for the first of two pre-sync blocks is detected, a logic "high" sync stand-by signal is generated only during the sync area period of the second pre-sync block. Thereafter, a logic "high" sync stand-by signal is generated only during the sync area period of 149 data sync blocks at a 90-byte cycle, and then, a logic "high" sync stand-by signal is generated only during the sync area period of a post-sync block.

When the sync detection signal 9 for a data sync block is detected by sync pattern detector 320 during the sync stand-by period, and an ID comparing signal 11 output from ID comparing circuit 333 shown in FIG. 10 is "high", pseudo-sync control signal generator 340 outputs the sync control signal 13 to demodulator 200 shown in FIG. 6, thereby enabling the correct detection of data. Demodulator 200 delays the data reproduced by head 100 during the time for generating the sync control signal 13 from the pseudo-sync control signal generator 340.

On the other hand, even though no sync detection signal 9 is detected during the sync stand-by period, if an ID comparing signal is "high", pseudo-sync control signal generator 340 outputs the sync control signal 13 to demodulator 200. Here, the sync control signal 13 functions as a pseudo-sync control signal. Even though the ID comparing signal is "low", if a sync detection signal 9 is detected, the sync control signal 13 is normally output. However, if no sync detection signal 9 is detected and the ID comparing signal 11 is "low", the sync control signal is prevented from being output to demodulator 200 and a sync stand-by signal 12 is not permitted to be output to sync pattern detector 320.

That is, if no sync pattern is detected due to a sync error, a sync control signal (pseudo-sync control signal) is forcibly generated, and if no sync pattern is successively detected, all the sync patterns of data on EL corresponding track are detected to thereby detect data.

Further, when the final sync, i.e., a post-sync for a corresponding area is detected, pseudo-sync control signal generator 340 outputs a post-sync detection signal 15 to control signal and area signal generator 313 of run-up pattern detector 310 shown in FIG. 8, as described above.

Whenever a sync detection signal for a data sync block is generated after a sync detection signal for a pre-sync block, that is, whenever the sync control signal. 13 is output to demodulator 200, a sync and ID area signal 14 is output to data selector 360. Data selector 360 separates a sync and an ID from delayed data 16 from the delay 350, according to the sync and ID area signal, extracts only real data and a parity, and outputs the extracted data and parity signal 17 to error correction decoder 400.

Even if the present invention is not provided with an ID separator 330 using a detected ID signal for a correct sync detection, there are no operational problems.

As described above, in the circuit of the present invention, a sync used for detecting data at a predetermined position is accurately detected and, even though an error is found in the sync, a pseudo-sync control signal is generated, thereby enabling the correct detection of the data at the predetermined position.

What is claimed is:

1. A sync detecting and protecting circuit for use in a reproducing apparatus for reproducing digital data from a recording medium, wherein a plurality of areas for recording said digital data are arranged in sequential tracks, wherein each area comprises a plurality of sync blocks and a pre-amble pattern, said sync detecting and protecting circuit comprising:

first detecting means for detecting a pre-amble pattern of said digital data and for outputting digital data for a plurality of area signals, each corresponding to a respective area;

second detecting means for detecting a sync pattern of said digital data, for comparing said detected sync pattern and a predetermined sync pattern, and for outputting a sync detection signal;

control signal generating means for generating a sync control signal based on said sync detection signal, and for generating a pseudo-sync control signal if said detected sync pattern has one or more errors; and an ID separating means, responsive to an output of said second detecting means, for separating an ID code recorded after said detected sync pattern, for comparing said separated ID code with an ID of at least one of a previous track and sync block, and for outputting an ID comparison signal.

2. A sync detecting and protecting circuit as claimed in claim 1, wherein said control signal generating means generates the sync control signal based on said sync detection signal and said ID comparison signal.

3. A sync detecting and protecting circuit as claimed in claim 1, wherein said control signal generating means generates a sync and ID area signal based on said sync detection signal.

4. A sync detecting and protecting circuit as claimed in claim 3, further comprising:

delaying means for delaying the digital data output from said first detecting means by a time interval substantially corresponding to an interval for generating said sync and ID area signal in said generating means; and data selecting means for removing a sync pattern and ID information of the digital data output from said delaying means according to said sync and ID area signal, and for outputting said sync-and-ID-removed digital data.

5. A sync detecting and protecting circuit as claimed in claim 1, wherein said first detecting means comprises:

a pre-amble comparing circuit for comparing a predetermined pre-amble pattern with a pre-amble of said input digital data in response to a head switching signal and for outputting a first comparing signal;

a run-up pattern comparing circuit for comparing a predetermined run-up pattern with a run-up pattern of digital data output from said pre-amble comparing circuit in response to said first comparing signal, and for outputting a second comparing signal; and an area signal generator for generating the plurality of area signals corresponding to respective areas of said plurality of areas based on said first and second comparing signals.

6. A sync detecting and protecting circuit as claimed in claim 5, wherein said second detecting means comprises:

a sync pattern generator for generating respective sync patterns for said plurality of areas corresponding to said plurality of area signals; and a sync pattern comparing circuit for comparing the sync pattern of said digital data with said generated sync pattern and for outputting said sync detection signal.

7. A sync detecting and protecting circuit as claimed in claim 6, wherein said second detecting means further comprises a delay for delaying said digital data by a time interval substantially corresponding to an interval for generating a respective area signal of said plurality of area signals and outputting said delayed digital data to said sync pattern comparing circuit.

8. A sync detecting and protecting circuit as claimed in claim 6, wherein said ID separating means comprises:

an ID detector for detecting an ID from digital data output from said sync pattern comparing circuit in response to said sync detection signal;

a memory for storing track pair data corresponding to track pair information of a previous track and number data corresponding to the number of a previous sync block;

an error corrector for correcting the errors of said detected ID and for outputting error-corrected ID; and an ID comparing circuit for comparing said error-corrected ID with said track pair data in response to said head switching signal, for comparing said error-corrected ID with said number data, and for outputting said ID comparison signal.

9. A sync detecting and protecting circuit as claimed in claim 8, wherein said control signal generating means outputs a previous sync control signal as a pseudo-sync control signal when only said ID comparison signal is detected without said sync detection signal, and prevents the outputting of said sync control signal when said sync detection signal is not detected successively.

10. A sync detecting and protecting circuit for use in a reproducing apparatus of a digital video cassette recorder including demodulating means for reproducing and demodulating data sequentially recorded on a plurality of areas on a digital tape having an SD recording format, error correction decoding means for error-correction decoding the data output from said demodulating means, and data expanding means for expanding said error-correction decoded data, said sync detecting and protecting circuit comprising:

run-up pattern detecting means for detecting a run-up pattern of the digital data output from said demodulating means, and for generating a corresponding area signal;

sync pattern detecting means for detecting a sync pattern from data demodulated in said demodulating means, for comparing said detected sync pattern with a predetermined sync pattern, and for outputting a sync detection signal;

ID separating means for separating an ID following said sync pattern detected in said sync pattern detecting means, for comparing said separated ID with an ID of at least one of a previous track and sync block, and for outputting an ID comparing signal;

pseudo-sync control signal generating means for outputting a sync control signal based on said sync detection signal and said ID comparing signal, for generating a pseudo-sync control signal if an error is detected in said detected sync pattern, and for generating a sync and ID area signal based on said sync detection signal; and data selecting means for removing the sync pattern and ID of digital data output through said run-up pattern detecting means according to said sync and ID area signal, and for outputting said sync-and-ID-removed data to said error correction decoding means.

11. A sync detecting and protecting circuit as claimed in claim 10, further comprising delaying means for delaying the data output through said run-up pattern detecting means by a time interval substantially corresponding to an interval for generating said sync and ID area signal, and for outputting said delayed data to said data selecting means.

12. A sync detecting and protecting circuit as claimed in claim 10, wherein said run-up pattern detecting means comprises:

a pre-amble comparing circuit for comparing a predetermined pre-amble pattern with a pre-amble of the digital data output from said demodulating means in response to a head switching signal, and outputting a first comparing signal;

a run-up pattern comparing circuit for comparing a predetermined run-up pattern with a run-up of digital data output from said pre-amble comparing circuit in response to said first comparing signal, and for outputting a second comparing signal; and a control signal and area signal generator for is generating a first enable signal for enabling said pre-amble comparing circuit in response to said head switching signal, for generating a second enable signal for enabling said run-up pattern comparing circuit in response to said first enable signal, and for generating a plurality of area signals, each corresponding to respective areas of said plurality of areas.

13. A sync detecting and protecting circuit as claimed in claim 12, wherein said sync pattern detecting means comprises:

a sync pattern generator for generating respective sync patterns for said plurality of areas corresponding to said plurality of area signals; and a sync pattern comparing circuit for comparing the sync of the digital data output from said demodulating means with said generated sync pattern, and for outputting said sync detection signal.

14. A sync detecting and protecting circuit as claimed in claim 13, wherein said sync pattern detecting means further comprises a delay for delaying the digital data output from said demodulating means by a time interval substantially corresponding to an interval for generating a respective area signal of said plurality of area signals.

15. A sync detecting and protecting circuit as claimed in claim 13, wherein said ID separating means comprises:

an ID detector for detecting an ID from the digital data output from said sync pattern comparing circuit;

a memory for storing track pair data corresponding to track pair information of a previous track and number data corresponding to a number of the previous sync block;

an error corrector for correcting the errors of said detected ID and for outputting error-corrected ID; and an ID comparing circuit for comparing said track pair data with said error-corrected ID in response to said head switching signal, for comparing said number data with said error-corrected ID in response to said sync detection signal, and for outputting said ID comparing signal.

16. A sync detecting and protecting circuit as claimed in claim 15, wherein said pseudo-sync control signal generating means outputs the previous sync control signal as a pseudo-sync control signal when only said ID comparing signal is detected without said sync detection signal, and prevents the outputting of said sync detection signal when said sync detection signal is not detected successively.

17. A sync detecting and protecting method for use in a reproducing apparatus for reproducing digital data from a recording medium in which a plurality of areas for sequentially recording said digital data are arranged in a plurality of tracks, wherein each area comprises a plurality of sync blocks and a pre-amble pattern, said sync detecting and protecting method comprising:

(a) detecting a pre-amble pattern of said digital data received from said recording medium and generating a corresponding area signal;

(b) detecting a sync pattern of said received digital data, comparing said detected sync pattern with a predetermined sync pattern, and generating a sync detection signal;

(c) separating an ID code following said sync pattern detected in step (b), comparing said separated ID code with an ID of at least one of a previous track and sync block, and generating an ID comparison signals;

(d) generating a sync control signal based on said sync detection signal, and generating a pseudo-sync control signal if an error is found in said detected sync pattern.

18. A sync detecting and protecting method as claimed in claim 17, wherein a sync control signal is generated based on said sync detection signal and said ID comparison signal.

* * * * *